US011410022B2

(12) United States Patent
Mehnert

(10) Patent No.: US 11,410,022 B2
(45) Date of Patent: Aug. 9, 2022

(54) METHOD AND A MACHINE LEARNING SYSTEM FOR CLASSIFYING OBJECTS

(71) Applicant: Robert Bosch GmbH, Stuttgart (DE)

(72) Inventor: Jens Eric Markus Mehnert, Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 980 days.

(21) Appl. No.: 16/151,841

(22) Filed: Oct. 4, 2018

(65) Prior Publication Data
US 2019/0108435 A1 Apr. 11, 2019

(30) Foreign Application Priority Data
Oct. 6, 2017 (DE) ..................... 10 2017 217 844.2

(51) Int. Cl.
*G06N 3/04* (2006.01)
*G01S 7/48* (2006.01)
*G06V 20/58* (2022.01)
*G06N 20/00* (2019.01)
*G01S 17/48* (2006.01)
*G06K 9/62* (2022.01)
*G06N 3/08* (2006.01)
(Continued)

(52) U.S. Cl.
CPC .......... *G06N 3/0454* (2013.01); *G01S 7/4802* (2013.01); *G01S 17/48* (2013.01); *G06K 9/6267* (2013.01); *G06N 3/08* (2013.01); *G06N 20/00* (2019.01); *G06V 20/584* (2022.01); *G01S 17/88* (2013.01); *G01S 17/931* (2020.01)

(58) Field of Classification Search
CPC ........ G06N 3/0454; G06N 20/00; G06N 3/08; G06V 20/584; G01S 7/4802; G01S 17/48; G06K 9/6267
See application file for complete search history.

(56) References Cited

U.S. PATENT DOCUMENTS

2017/0057521 A1* 3/2017 Jain ..................... B60W 40/09
2018/0101173 A1* 4/2018 Banerjee ............. G05D 1/0094
(Continued)

FOREIGN PATENT DOCUMENTS

DE 112011104645 T5 10/2013

OTHER PUBLICATIONS

Multi-View 3D Object Detection Network for Autonomous Driving by Xiaozhi Chen, Huimin Ma, Ji Wan, Bo Li, Tian Xia, Department of Electronic Engineering, Tsinghua University, Baidu Inc. (LIDARarXiv: 1611.07759v3 [cs.CV] Jun. 22, 2017).
(Continued)

*Primary Examiner* — David Bilodeau
(74) *Attorney, Agent, or Firm* — Norton Rose Fulbright US LLP; Gerard Messina

(57) ABSTRACT

A method for classifying an object having the following: receiving at least one item of distance information of an object based on a first electromagnetic signal transmitted by a transmitter device and a first electromagnetic signal received by a receiver device; receiving at least one item of oscillation information of the object based on a second electromagnetic signal transmitted by a transmitter device and a second electromagnetic signal received by a receiver device, which represents a solid oscillation of at least one subsection of the object; and classifying the object based on the received information.

20 Claims, 3 Drawing Sheets

(51) Int. Cl.
 *G01S 17/88* (2006.01)
 *G01S 17/931* (2020.01)

(56) References Cited

U.S. PATENT DOCUMENTS

2018/0372874 A1* 12/2018 Lipson .................. G01S 7/4815
2019/0318177 A1* 10/2019 Steinberg ................ G01S 17/58

OTHER PUBLICATIONS

"Learning Hierarchical Semantic Segmentations of LIDAR Data" by David Dohan, Brian Matejek, and Thomas Funkhouser of Princeton University, Princeton, NJ, USA.

* cited by examiner

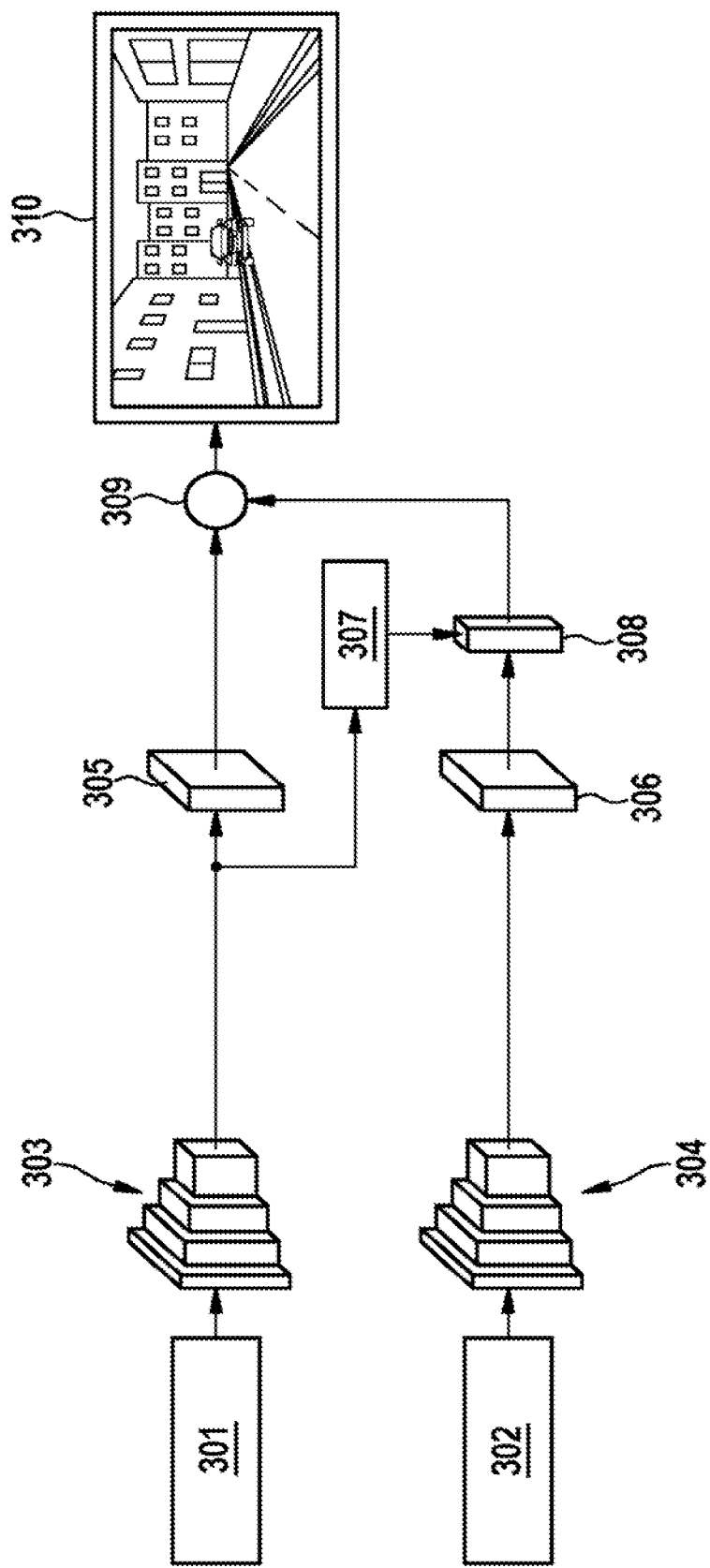

METHOD AND A MACHINE LEARNING SYSTEM FOR CLASSIFYING OBJECTS

RELATED APPLICATION INFORMATION

The present application claims priority to and the benefit of German patent application no. 10 2017 217 844.2, which was filed in Germany on Oct. 6, 2017, the disclosure which is incorporated herein by reference.

FIELD OF THE INVENTION

The present invention relates to a method and a machine learning system for classifying objects.

BACKGROUND INFORMATION

The publication "Multi-View 3D Object Detection Network for Autonomous Driving" by Xiaozhi Chen, Huimin Ma, Ji Wan, Bo Li, Tian Xia, Department of Electronic Engineering, Tsinghua University, Baidu Inc. (LIDAR-arXiv: 1611.07759v3 [cs.CV] 22 Jun. 2017) describes a method for highly precise 3D object detection in scenarios for highly automated driving. For the purpose of detecting objects, data of a camera and of a lidar are fed into an object detection network.

The publication "Learning Hierarchical Semantic Segmentations of LIDAR Data" by David Dohan, Brian Matejek, and Thomas Funkhouser of Princeton University, Princeton, N.J., USA, discloses a method for semantic segmentation of data recorded by a lidar.

SUMMARY OF THE INVENTION

The present invention describes a method for classifying an object having the following steps:
- receiving at least one item of distance information of an object based on a first electromagnetic signal transmitted by a transmitter device and a first electromagnetic signal received by a receiver device;
- receiving at least one item of oscillation information of the object based on a second electromagnetic signal transmitted by a transmitter device and a second electromagnetic signal received by a receiver device, which represents a solid oscillation of at least one subsection of the object;
- classifying the object based on the received information.

Classifying is here understood as the application of a classification to an object by selecting a fitting class of a given classification. The transmitter and/or receiver devices may either be different devices or the same transmitter and/or receiver device. It is also possible to use the same receiver device and different transmitter devices or different receiver devices and the same transmitter device.

The distance information may be a distance between the receiver and/or transmitter device and the object. The distance information, however, may also represent a different distance or a distance from a different reference. If the transmitter and/or receiver device is located on a vehicle roof for example, it is possible to add an additional offset to the ascertained distance so that it indicates the distance information of the distance from various vehicle boundaries such as the bumper for example.

The oscillation information contains information about the solid oscillations performed by the object, which may be caused for example by sources of noise near the object and/or vibrations and/or other mechanical excitations of the object. Since possibly only a subsection of the object is detected by the electromagnetic radiation, or only information of a subsection of the object is detectable by the receiver device, these items of oscillation information are also only able to represent solid oscillations of a subsection of the object.

The reception of information is understood as a provision of this information. The information on the one hand may be transmitted from one unit to another, for example from one control unit to another control unit, but they may also be passed on within a control unit and be merely received/utilized by another application such as a computer program or a machine learning method or a neural network. For example, it is possible that one control unit both ascertains the information as well as receives this information. In the present document, the information may be understood both as measured values as well as measured values that have already been evaluated. It is possible, for example, for an item of information to represent distance information via a time delay between a transmitted and a received signal or information about a phase difference between transmitted and received radiation. The same applies to oscillation information.

By evaluating the oscillation information, this invention offers the advantage of providing an additional characteristic or an additional property of the object, which may be used advantageously to classify the object. This makes it possible to improve a classification accuracy or a classification quality of a respective classification method. Such methods may be used for example for operating a vehicle, the vehicle being operated on the basis of the classification.

In another specific embodiment of the method, the electromagnetic signals are optical signals. The wavelengths of optical signal are generally between 400 nm and 1 mm. In particular, these are optical signals of wavelengths between 700 nm and 8,000 nm, further in particular between 800 nm and 1,400 nm and further in particular between 1,000 nm and 1,300 nm.

This specific embodiment of the present invention offers the advantage of making it possible to perform a classification using optical signals, for example of a laser. Since human beings also gather information primarily with their eyes, this makes it possible to classify relevant objects.

If wavelengths between 700 nm and 8,000 nm are used, this has the advantage that these wavelengths are not visible to the human eye. When using these in areas in which human beings may be present, this avoids endangering and impairing the human beings.

If wavelengths between 800 nm and 1,400 nm are chosen, then it is possible to ensure a good range of the optical radiation.

The wavelength range between 1,000 nm and 1,300 nm is advantageous since optical radiation in this wavelength range is directly absorbed by the cornea of the human eye and consequently cannot result in damage to the eye. This ensures a safe use of this method in areas in which human beings are present.

In another specific embodiment of the method, the received electromagnetic signals are signals of the transmitted electromagnetic signals that are reflected by the object.

In this specific embodiment, an object is irradiated by a transmitter device with electromagnetic radiation, and the radiation reflected at least partially by the object is detected by a receiver device. Consequently, both the distance information as well as the oscillation information are based on physical properties of the transmitted and received electromagnetic radiation.

This specific embodiment of the present invention offers the advantage that a detection of the information is possible merely by evaluating the electromagnetic radiation, which is transmitted by a transmitter unit and received by a receiver unit. No additional information is required from external sources such as a server and/or additional sensors and/or sources of information.

In another specific embodiment of the method, the first and second transmitted signal is the same transmitted signal and the first and second received signal is the same received signal.

In this specific embodiment, the transmitter and receiver device is also the same device.

This specific embodiment of the present invention offers the advantage of allowing for a classification merely on the basis of a transmitted and a received signal. This makes it possible to detect and evaluate multiple object features on the basis of one measurement. This makes it possible to improve a classification quality at the same costs and without substantial additional effort.

In another specific embodiment of the method, the distance information is ascertained based on a propagation time measurement of the first transmitted and first received signal and/or a measurement of a phase relation between the first transmitted and first received signal and/or via a triangulation method.

This specific embodiment offers the advantage of being able to obtain distance information very quickly and in an uncomplicated manner via the propagation time measurement. It is also possible to ascertain this information and determine it possibly even more precisely via a measurement of the phase relation.

Alternatively or additionally, the distance may also be determined via a triangulation method, in which the transmitter device and the receiver device are separated in terms of location. In most cases, a small separation of transmitter device and receiver device in terms of location may be necessary because they are different devices. For triangulation, however, very large separations may also be chosen, for example greater than 1 m or greater than 5 m or greater than 100 m. This makes it possible to measure even very small movements of objects on the basis of a spatial deflection of the electromagnetic radiation, for example in accordance with a laser microphone operated via triangulation.

Such a method may be applied for example when using transmitter and receiver devices situated in an offset manner, for example in parking facilities or in vehicles.

In another specific embodiment of the method, the oscillation information is ascertained based on at least one propagation time measurement of the second transmitted and second received signal and/or a measurement of a phase relation between the second transmitted and second received signal and/or via a triangulation method.

This specific embodiment of the method likewise offers the above-mentioned advantages. In particular, by measuring a phase relation between transmitted and received radiation it is possible to detect very small oscillations of the object such that this method is well suited for detecting oscillations of solids. A triangulation method is also suitable for measuring the oscillation of solids and is used for example in some laser microphones.

Both for ascertaining the distance information as well as for ascertaining the oscillation information, it is possible to use multiple methods in combination. By ascertaining the information using multiple different methods it is therefore possible to create a redundancy.

In another specific embodiment of the present invention, the distance information is ascertained on the basis of a propagation measurement of the first electromagnetic signals and the oscillation information is ascertained on the basis of a measurement of a phase relation between the second electromagnetic signals.

This specific embodiment of the method offers the advantage of using measuring methods well suited for ascertaining the distance information and the oscillation information. Since the measuring methods differ, this also creates a kind of redundancy so that the probability that both items of information are flawed is reduced.

In another specific embodiment of the method, surroundings are scanned spatially. For this purpose, at least one item of distance information and one item of oscillation information are respectively received for at least two different regions of the surroundings and this is followed by a classification, in particular a semantic segmentation, of the scanned surroundings on the basis of the received information.

This specific embodiment of the method offers the advantage of producing an image of the surroundings in which objects may be represented in a classified manner. Such methods are essential for automated vehicles or robots, in particular if these are to move autonomously. In a semantic segmentation, this method attempts to assign an object to each measured value. If this is not possible, the measured value is marked accordingly, for example in that it is assigned the value 0. In this method it is not necessary to ascertain for each scanned region of the surroundings both an item of distance information as well as an item of oscillation information. It suffices if this information is ascertained at least for respectively two different regions. It is also conceivable that substantially more distance values are ascertained in the scanning process and that additionally an item of oscillation information is ascertained only for a certain percentage.

In another specific embodiment of the present invention, the received distance information and the oscillation information are based on measured data of a lidar and/or a radar.

This specific embodiment of the present invention offers the advantage that the method may be realized by already utilized technologies and may consequently be implemented in a very cost-effective and timely manner. Specifically the wavelengths of a lidar allow for reliable measurements of solid oscillations of objects.

For example, a lidar may be used in addition to the distance detection as a laser microphone so that information additionally obtained in this manner allows for an improved classification. Instead of detecting objects merely on the basis of classical methods by evaluating distance values and by geometries and movement detected by these, the noise or oscillation information of the corresponding image region is additionally supplied to a classifier, which is able to obtain a better classification result on the basis of the additional information.

Another advantage is that only one sensor is required in order to obtain two items of information that are independent of each other.

Moreover, object tracking is simplified since the detection and tracking of objects is improved on the basis of an object-typical oscillation behavior.

A method as recited in one of the preceding claims, wherein the classification occurs on the basis of a comparative classification algorithm and/or a machine learning system.

The comparative classification algorithm uses comparative methods for classification so that a data record with comparative data must be provided. On the basis of a comparison of the information with the comparative data it is therefore possible to classify objects.

The machine learning system generally does not require comparative data of that kind. If the machine learning system is based on a neural network for example, then this network alone may be sufficient to carry out a classification. On the basis of weights of the neural network adapted in a learning process, it is possible to classify different objects reliably, without requiring additional information from databases or the like for this purpose.

This specific embodiment of the method offers the advantage that on the basis of the information a classification is possible even when the oscillation information for example per se does not seem to provide a detectable added value since its occurrence initially does not seem to follow an explicable pattern. When detecting and evaluating a large quantity of measured values, however, it may be possible to extract characteristic features that by way of the mentioned methods result in an added value and improved classification qualities. Particularly when using a machine learning system, such information may be processed very well and used profitably.

Furthermore, a machine learning system for classification is claimed, which is configured and was trained so as to perform a classification of an object, based on at least one item of distance information of the object, which is supplied to the machine learning system and is based on a first electromagnetic signal transmitted by a transmitter device and a first electromagnetic signal received by a receiver device, and at least one item of oscillation information of the object, which is supplied to the machine learning system and is based on a second electromagnetic signal transmitted by a transmitter device and a second electromagnetic signal received by a receiver device, which represents a solid oscillation of at least one subsection of the object.

Different methods may be used to train the machine learning system such as monitored learning or unmonitored learning. As a machine learning system, it is possible to use for example an artificial neural network, a recurrent neural network, a convolutional neural network or a network based on back-propagation. The use of an auto-encoder or comparable structures or algorithms is also conceivable. Combinations of multiple algorithms or network types are also possible. Generally, it is also possible to network multiple networks with one another and to use output values of individual networks as input values in further networks.

Another specific embodiment of the machine learning system has at least three neural networks, the at least one item of distance information being input into an input layer of a first neural network, the at least one item of oscillation information being input into an input layer of a second neural network and data output by the first and the second neural networks being input into an input layer of a third neural network, in particular, a classification of objects being performed by the third neural network.

This specific embodiment of the present invention offers the advantage that initially networks evaluate the two different items of information and that subsequently the already processed information is transmitted to the third neural network. Depending on the utilized neural network, this makes it possible to improve both the performance of the machine learning system as well as its classification quality.

Furthermore, a machine-readable storage medium is claimed, on which the machine learning system is stored.

Furthermore, a device for classification, in particular a control unit is claimed, which is configured to implement a method for classification according to a method on which this invention is based.

In another specific embodiment of the present invention, this device comprises the machine-readable storage medium disclosed above.

BRIEF DESCRIPTION OF THE DRAWINGS

FIG. 3 shows an exemplary implementation of the method using another machine learning method.

DETAILED DESCRIPTION

In a first exemplary embodiment, a laser, which radiates light at a wavelength of approximately 900 nm, is mounted as a transmitter device in a parking facility. The laser is operated in a pulsed manner and transmits pulses at a length of 5 ns. A highly sensitive photodiode, which is accommodated together with the laser in a common housing and which acts as a receiver device, receives electromagnetic signals transmitted by the laser and reflected by an object. The laser and the photodiode are operated in time-synchronized manner so as to make it possible to measure both the propagation time of the laser pulse, which is required for the laser to travel the distance from the laser to an object and back to the image sensor, as well as a phase difference between the transmitted laser pulse and the received signal.

On a processing unit likewise accommodated in the housing, the transmitted and received signals are evaluated in such a way that a distance of an object irradiated by the laser is ascertained on the basis of a propagation time measurement of the transmitted and the received signal. In addition, oscillation information of the object is ascertained based on a measurement of a phase relation between the transmitted and the received signal. Since the reflected signal, depending on the distance of the object from the laser, is possibly received only after the laser pulse has been transmitted completely, due to the short laser pulses, the phase of the transmitted signal that is theoretically available at an infinite pulse length is used for ascertaining the phase difference.

The distance and oscillation information ascertained in this manner is provided by the processing unit and is transmitted via an interface to a central server.

Figure 1:
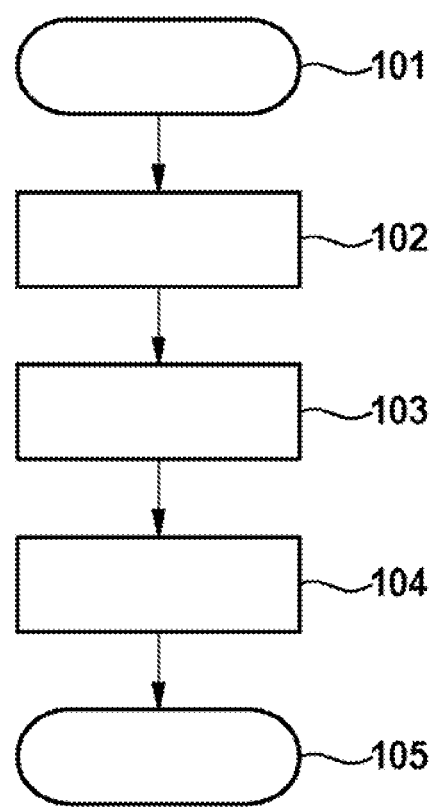
FIG. 1 shows a schematic method diagram.

The method shown in FIG. 1 runs on this central server beginning with step 101.

In step 102, the distance information is received by the central server.

In step 103, the oscillation information is received by the central server.

In step 104, the object is classified based on the received information, that is, it is ascertained what kind of object it is. The object may be assigned to the most varied classes such as for example a motor vehicle, pedestrian, cyclist, shopping cart, etc. Substantially more detailed classifications may also be performed such as compact automobile, station wagon, limousine, adult person, child, etc.

The method ends with step 105.

Figure 2:
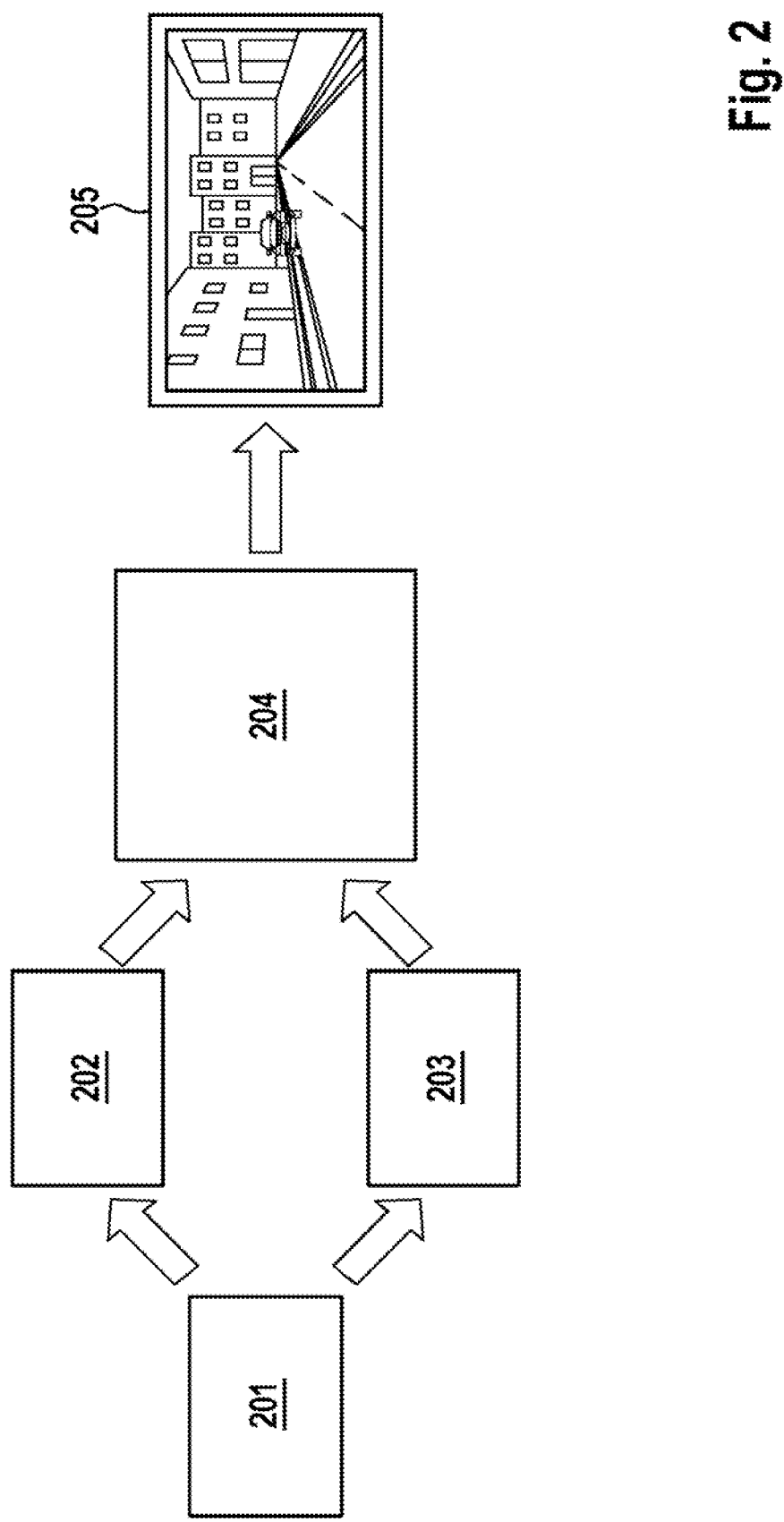
FIG. 2 shows a possible implementation of the method using a machine learning method.

In this exemplary embodiment, the classification is performed by a machine learning system, which is sketched in FIG. 2.

Distance information and oscillation information of an object is ascertained by a measuring device 201, in this case the laser, the photodiode and the processing unit. The distance information is fed into an input layer of a first neural network 202, and the oscillation information is fed into a second neural network 203. The two neural networks 202, 203 respectively have multiple hidden layers and an output layer. The data read out respectively at the output layers of networks 202, 203 are fed as input data into a third neural network 204. Third neural network 204 has an output layer having n neurons, n corresponding to the number of different classes that are to be distinguished by the neural network. One class is accordingly associated with each neuron of the output layer. In this exemplary embodiment, the value read out at each neuron of the output layer corresponds to a probability that the object, whose distance and oscillation information was evaluated, is an object of the class associated with the respective neuron. In this exemplary embodiment, the information read out from the output layer of third neural network 204 is visually represented on a display 205.

In this exemplary embodiment, there are additionally cameras situated in the parking facility, which likewise cover the areas that the laser is able to irradiate. These camera images are likewise evaluated and are represented on screen 205 together with the additional information from the measurements by the laser.

In another exemplary embodiment, the distance and the oscillation information is detected by different systems. A radar system covering a predefined area of a parking facility is used to ascertain the distance information. Multiple lasers and laser detectors are used to ascertain the oscillation information, the laser detectors respectively being situated spatially separated from the lasers. In this exemplary embodiment, the laser and the laser detector are respectively situated approximately 10 m apart from each other. In this manner it is possible to detect small solid oscillations of objects using a triangulation method. The information detected by the two systems is transmitted to a central server, which evaluates the information and performs a classification of the objects detected by the systems based on the information.

In another exemplary embodiment, an area of a parking facility is irradiated by multiple lasers, the lasers irradiating areas that are spatially separated from one another. A laser detector is assigned to each laser, which detects the reflected signals of the respective laser. The lasers are operated in a pulsed manner and are activated in time-delayed manner so that there can be a clear separation of the light pulses. Based on the signals detected by the laser detectors, a processing unit ascertains distance information and oscillation information for the different areas or for irradiated objects in the different areas. Both the propagation times of the individual pulsed wave trains as well as the phase differences between the received and the transmitted pulses are used to ascertain the distance and oscillation information. Since multiple lasers are used in this exemplary embodiment, it is possible to use the received data to generate a 3D image of the surroundings representing irradiated objects. In this exemplary embodiment as well, the data are evaluated using a neural network, which performs a classification of the individual items of distance and oscillation information. A 3D image of the surroundings is developed in this manner, in which additionally individual objects are classified. The image generated in this manner may be subsequently displayed on a screen.

In another exemplary embodiment, a rotatable lidar sensor is mounted on a vehicle. This contains 64 lasers and 64 laser detectors, which are able to cover a vertical visual range of approximately 30°. The sensor is additionally able to rotate up to 20 times per second about a vertical axis, which thus allows for a 360° recording of a surroundings of the vehicle. Depending on the speed of rotation, it is theoretically possible to ascertain over 250,000 items of distance and oscillation information if a reflection of the transmitted radiation is detected from each irradiated area. In this exemplary embodiment, the distance and oscillation information is evaluated by a machine learning system, which performs a semantic segmentation of the recorded 360° images. This creates a distance image of a surroundings, which additionally contains information about the type of the irradiated objects. Such information is extremely useful for automated systems, in particular for systems that move in automated manner such as vehicles driving in automated manner.

In another exemplary embodiment, the distance and oscillation information is ascertained by a radar sensor installed in a vehicle.

Here too, both the propagation times as well as the phase differences between transmitted and received radiation are used for ascertaining this information. The information is subsequently fed into a neural network, which performs a classification on the basis of the detected data.

FIG. 3 shows an exemplary embodiment of a machine learning system, which is configured and was trained so as to perform a classification of an object, based on at least one item of distance information of the object, which is supplied to the machine learning system and is based on a first electromagnetic signal transmitted by a transmitter device and a first electromagnetic signal received by a receiver device, and at least one item of oscillation information of the object, which is supplied to the machine learning system and is based on a second electromagnetic signal transmitted by a transmitter device and a second electromagnetic signal received by a receiver device, which represents a solid oscillation of at least one subsection of the object.

The machine learning system has a first 303 and a second 304 convolutional neural network, into which oscillation information 302 and distance information 301 enter, distance information 301 being fed into first neural network 303 and oscillation information 302 being fed into second neural network 304. A deconvolutional neural network 306 is situated behind the second neural network, which processes the data of an output layer of second neural network 304 further. Based on the data of an output layer of first neural network 303, an interposed algorithm 307 performs a first rough image evaluation, the result of which is used for pooling the data processed by second neural network 304 and deconvolutional neural network 306. The pooling is performed in a fourth neural network 308, which at the same time outputs the final classification of the fed-in oscillation data 302.

The data output by first neural network 303 are likewise processed further in a deconvolutional neural network 305, which outputs a classification of the fed-in distance data 301. The data output by the deconvolutional neural networks 308, 305 are fused by a further algorithm 309. An element-wise averaging is performed in the process.

In this exemplary embodiment, data of a vehicle surroundings were fed in, which are representable as semantically segmented 3D surroundings 310 on the basis of the data output by algorithm 309, and which may be used for any desired subsequent applications.

In another exemplary embodiment, the machine system is trained in such a way that oscillation information 302 is fed into neural network 303 and the distance information is fed into neural network 304 and a classification is performed in this manner.

In another exemplary embodiment, both the distance information as well as the oscillation information is subjected to pooling. For this purpose, another neural network may be interposed behind the deconvolutional neural network 305. The pooling performed in this network is in this exemplary embodiment influenced by output data of neural network 304. In another exemplary embodiment, pooling occurs without influence from the respective other evaluation channel (the oscillation information and distance information, respectively).

In another exemplary embodiment, a vehicle is equipped with a lidar and a control unit, which ascertains on the basis of the data detected by the lidar a semantic segmentation and 3D representation of a vehicle surroundings. Multiple driver assistance systems are operated based on the ascertained information of the vehicle information. Inter alia, an emergency braking assistant, an ACC function and an automated parking system are operated using the ascertained information.

In another exemplary embodiment, a lidar is used to scan a surroundings and both distance information as well as oscillation information is ascertained for each scanned area. This information is subsequently fed into a common neural network, which performs a classification based on the jointly fed-in information.

In another exemplary embodiment, again a lidar is used to scan a surroundings, multiple spatially separated areas being irradiated by a pulsed radiation of a wavelength of 1,300 nm and reflections of the emitted radiation being detected. The measured values and the emission times and phase relations of the transmitted light pulsed are subsequently fed into a machine learning system, which performs a classification of the recorded areas on the basis of these data.

This machine learning system is trained using a monitored learning method. The above-mentioned data were used as input values for this purpose and were fed in accordingly. The output values were compared to reference values, which were prepared using a classification algorithm and manual assignment of objects based on camera images of the same surroundings.

In another exemplary embodiment, a semantic segmentation is performed on the basis of a lidar sensor, which is mounted on a vehicle, a class being assigned to each measurement point recording by the lidar. In this exemplary embodiment, this would correspond to every distance value that the lidar sensor delivers.

The class of vehicle and background are mentioned as class by way of example.

The lidar sensor draws a non-tight 360° distance image having 32 elevation layers and a rotational speed-dependent azimuth angle resolution. Additionally, the lidar is used to build up a noise map, which represents the noise occurring at each position, of a previously defined grid network, since the last frame, or even over several frames. The noise map is prepared on the basis of the solid oscillations.

These two sources of information are treated differently by the classifier, an AI module in this exemplary embodiment. A spatial context is used to detect a vehicle on the distance image, i.e. in order to be able to assign a class to an individual distance measurement of the lidar, the classifier considers a predefined number of distance measurements that are selected in such a way that they are able to describe the geometry of the vehicle. In this exemplary embodiment, all 32 elevation layers and respectively 32 distance values recorded in time-delayed manner in the 32 elevation layers are used (this corresponds to an opening angle of approximately 100°).

In order to be able to detect the vehicle on the basis of the noise map, the classifier simultaneously evaluates only additional measurement points (four in each case) bordering respectively one measurement point.

A common AI module generates from the two sources of information the desired result of the semantic segmentation, which ascertains in the mentioned exemplary embodiment a separation of vehicles and background.

What is claimed is:

1. A method for classifying an object, the method comprising:
receiving at least one item of distance information of an object based on a first electromagnetic signal transmitted by a transmitter device and a first electromagnetic signal received by a receiver device;
receiving at least one item of oscillation information of the object based on a second electromagnetic signal transmitted by a transmitter device and a second electromagnetic signal received by a receiver device, which represents a solid oscillation of at least one subsection of the object; and
classifying the object based on the received information.

2. The method of claim 1, wherein the electromagnetic signals are optical signals.

3. The method of claim 1, wherein the received electromagnetic signals are signals of the transmitted electromagnetic signals that are reflected by the object.

4. The method of claim 1, wherein the first and second transmitted signal is the same transmitted signal and the first and second received signal is the same received signal.

5. The method of claim 1, wherein the distance information is ascertained based on a propagation time measurement of the first transmitted and first received signal and/or a measurement of a phase relation between the first transmitted and first received signal and/or via a triangulation method.

6. The method of claim 1, wherein the distance information is ascertained based on at least one propagation time measurement of the second transmitted and second received signal and/or a measurement of a phase relation between the second transmitted and second received signal and/or via a triangulation method.

7. The method of claim 1, wherein the distance information is ascertained on the basis of a propagation time measurement of the first electromagnetic signals and the oscillation information is ascertained on the basis of a measurement of a phase relation between the second electromagnetic signals.

8. The method of claim 1, wherein a spatial scan of a surroundings is performed, at least one item of distance information and one item of oscillation information being respectively received for at least two different areas of the surroundings and a classification being performed of the scanned surroundings on the basis of the received information.

9. The method of claim 1, wherein the received distance information and the oscillation information are based on measured data of a lidar and/or a radar.

10. The method of claim 1, wherein the classification occurs on the basis of a comparison-based classification algorithm and/or a machine learning system.

11. A machine learning system for classification, comprising:
a machine learning device which is configured and trained so as to perform a classification of the object;
wherein the classification is based on at least one item of distance information of an object based on a first electromagnetic signal transmitted by a transmitter device and a first electromagnetic signal received by a receiver device, which is supplied to the machine learning device, and at least one item of oscillation information of the object based on a second electromagnetic signal transmitted by a transmitter device and a second electromagnetic signal received by a receiver device, which is supplied to the machine learning device and which represents a solid oscillation of at least one subsection of the object.

12. The machine learning system of claim 11, wherein the machine learning device has at least three neural networks, the at least one item of distance information being input into an input layer of a first neural network, the at least one item of oscillation information being input into an input layer of a second neural network and data output by the first and the second neural networks being input into an input layer of a third neural network.

13. A non-transitory computer readable medium having program code, which is executable by a processor, comprising: a program code arrangement having program code for classifying an object, by performing the following: receiving at least one item of distance information of an object based on a first electromagnetic signal transmitted by a transmitter device and a first electromagnetic signal received by a receiver device; receiving at least one item of oscillation information of the object based on a second electromagnetic signal transmitted by a transmitter device and a second electromagnetic signal received by a receiver device, which represents a solid oscillation of at least one subsection of the object; and classifying the object based on the received information.

14. A device for classification, comprising:
a computer readable medium having program code, which is executable by a processor, including a program code arrangement having program code for classifying an object, by performing the following:
receiving at least one item of distance information of an object based on a first electromagnetic signal transmitted by a transmitter device and a first electromagnetic signal received by a receiver device;
receiving at least one item of oscillation information of the object based on a second electromagnetic signal transmitted by a transmitter device and a second electromagnetic signal received by a receiver device, which represents a solid oscillation of at least one subsection of the object; and
classifying the object based on the received information.

15. The device of claim 14, wherein the electromagnetic signals are optical signals.

16. The method of claim 1, wherein the electromagnetic signals are optical signals, in particular of wavelengths between 700 nm and 8,000 nm.

17. The method of claim 1, wherein the electromagnetic signals are optical signals, in particular of wavelengths between 800 nm and 1,400 nm.

18. The method of claim 1, wherein the electromagnetic signals are optical signals, in particular of wavelengths between 1,000 nm and 1,300 nm.

19. The method of claim 1, wherein a spatial scan of a surroundings is performed, at least one item of distance information and one item of oscillation information being respectively received for at least two different areas of the surroundings and a classification, in particular a semantic segmentation, being performed of the scanned surroundings on the basis of the received information.

20. The machine learning system of claim 11, wherein the machine learning system has at least three neural networks, the at least one item of distance information being input into an input layer of a first neural network, the at least one item of oscillation information being input into an input layer of a second neural network and data output by the first and the second neural networks being input into an input layer of a third neural network, in particular, a classification of objects being performed by the third neural network.

* * * * *